Figure 1:
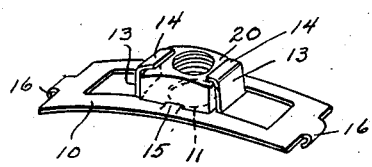

May 21, 1946.  G. A. TINNERMAN  2,400,666
FASTENING DEVICE
Filed Dec. 11, 1943

INVENTOR.
GEORGE A. TINNERMAN
BY
Bates, Teare, McDean
ATTORNEYS

Patented May 21, 1946

2,400,666

UNITED STATES PATENT OFFICE 2,400,666

FASTENING DEVICE

George A. Tinnerman, Cleveland, Ohio, assignor to Tinnerman Products, Inc., Cleveland, Ohio, a corporation of Ohio Original application July 31, 1936, Serial No. 93,679, now Patent No. 2,159,573, dated May 23, 1939. Divided and application February 23, 1939, Serial No. 257,900, now Patent No. 2,266,832, dated December 23, 1941. Divided and application August 16, 1941, Serial No. 407,181, now Patent No. 2,391,046, dated December 18, 1945. Again divided and this application December 11, 1943, Serial No. 513,867

5 Claims. (Cl. 85—32)

The present application is a division of my application No. 407,181, filed August 16, 1941, now U. S. Patent No. 2,391,046, issued December 18, 1945, as a division of application No. 257,900, filed February 23, 1939, now Patent No. 2,266,832, issued December 23, 1941. The last-mentioned application in turn is a division of earlier application No. 93,679, filed July 31, 1936, now Patent 2,159,573, issued May 23, 1939.

This invention relates to a fastening device comprising a nut and a carrier therefor adapted to be secured to a support and hold the nut in proper position to receive a bolt passing through the support.

It is an object of the present invention to provide in simple form a sheet metal carrier, which has means for positioning a nut which may be located on the upper side of the carrier or extend above it, the carrier having also means extending downwardly from its opposite ends to attach it firmly to a support. Another object of the invention is to enable the carrier to coact with a tapped nut which may be readily mounted on the carrier and has an angular exterior engaged by means on the carrier nut against rotation relative to the carrier, while the carrier has projections at its ends for anchoring itself to the support, so that the nut is held in proper registration with a bolt opening through the support.

Two embodiments of my invention are illustrated in the drawing hereof and are hereinafter more fully described, while the essential novel features are set out in the claims.

Figure 2:
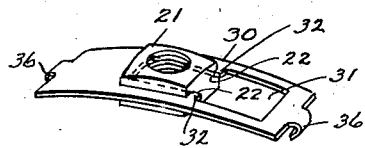
Figure 3:
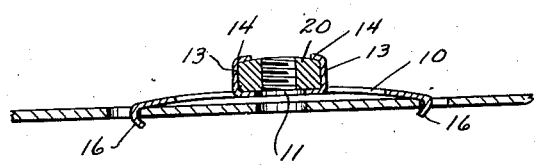
Figure 4:
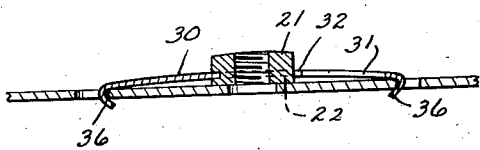

In the drawing, Fig. 1 is a perspective of one form of my two-part fastening device; Fig. 2 is a perspective of another form thereof; Figs. 3 and 4 are longitudinal sections of the fasteners shown in Figs. 1 and 2 respectively.

Referring now to Fig. 1, the fastener there shown comprises a body of sheet metal, which is indicated at 10, and which is preferably arched upwardly from end to end. The mid-portion of the body has a bolt receiving opening 11 in registration with the bolt opening in a nut 20. The nut retaining means may comprise tongues 13, each of which is struck upwardly from the body to leave open sections, and each of which has an inturned flange 14 adjacent the upper end thereof. The tongues are sufficiently close to exert spring pressure upon two side walls of the nut, so as to hold it securely in place. If desired, additional tongues 15 may be struck upwardly, one on each side of the body, for engaging the other side walls of the nut, which may be disposed at right angles to the faces which engage the tongues 13. The end of each tongue 15 acts, therefore, as an abutment to limit the movement of the nut during the inserting operation, so as to effect automatically registration of the opening 11 in the body with the bolt opening in the nut. The body may have spring tabs 16 extending downwardly and inwardly adjacent the ends thereof to provide converging hooks, so that the fastener may be pressed or snapped into engagement with spaced openings in the article for positioning the fastener in the desired location with reference to the article.

It will be seen that the overhanging flanges 14 engaging the top of the tapped nut prevent separation of the nut and carrier in the axial direction, while the engagement of the flat sides 13 with flat sides of the nut prevent its rotation.

The fastener illustrated in Fig. 2 has preferably an arched body 30 corresponding to that shown in Fig. 1, but the nut 21 is held in place by spring tension exerted against the wall of the groove 22, which extend along opposite faces of the nut. To position the nut on the fastener, the body of the fastener has an opening 31 therein, shaped to form two sections, one of which is larger than the overall dimensions of the nut, and the other of which is reduced in size to provide guideways 32 upon which the nut is supported. The fastener may also be provided with article-engaging spring tabs 36 at the ends thereof, by means of which it may be snapped into place and held upon the article, as heretofore described, with reference to Fig. 1.

The embodiment of Figs. 2 and 4, like that of Figs. 1 and 3, has downwardly projecting tongues 16 at the ends of the carrier. Accordingly, either embodiment is adapted to be readily and firmly anchored to a support by means of these tongues. When so attached the tapped nut is properly positioned.

In either embodiment the nut may be mounted on the carrier either before the carrier is mounted on the support or after such mounting, as may be more convenient. Whether the carrier is attached or free, the nut is mounted on the carrier merely by being shoved from a convenient position into place on the carrier, the shoving action in the first embodiment being laterally of the carrier and in the second embodiment longitudinally thereof.

It will be observed that, in each of the embodiments in my invention, the spring action of the clip if it has the arched form shown holds the nut out of contact with the support when the clip is first applied to the support, and before the bolt has been screwed home; but when the bolt is turned in, to its final position, the nut is thereby drawn toward the support and the clip flattened, so that its spring action tends to force the nut away from the support, thus establishing a frictional stress between the nut threads and the bolt threads, producing a nu-locking action which, in this case, restrains the unscrewing of the bolt.

From the foregoing description, it will be apparent that I have devised a fastener that can be economically made, and which will operate in a satisfactory manner to position a standard nut placed for receiving a threaded bolt. It will also be apparent that the fastener not only holds the nut in bolt receiving position, but also holds it against rotation during the tightening operation and exerts a nut-locking action on the bolt. The invention is further advantageous in that the fastener may be snapped or pressed into place on the supporting member and is self-retained in bolt-receiving position.

I claim:

1. A nut holder comprising a strip of resilient sheet metal of arched form, downwardly and inwardly projecting hooks at opposite ends of the strip, a pair of tongues cut out from the body of the clip but attached to it at their adjacent ends, at a distance apart corresponding to the width of a nut to be embraced, said tongues extending upwardly from the body of the clip and then flanged toward each other to overlie the top of the nut, and short tongues cut out from the side portions of the body and raised slightly to engage the other two walls of the nut, the nut being adapted to be slid into place across one of the short tongues by movement parallel with the intermediate upstanding flanged tongues.

2. A nut holder comprising a strip of resilient sheet material of arched form having retaining tongues at its opposite ends, said sheet having an opening through it with a narrower extension, thus leaving inwardly projecting ribs, and a nut of a size to be inserted in the wider portion of the opening and having grooves in opposite walls adapted to be occupied by said ribs when the inserted nut is slid lengthwise of the clip.

3. A nut holder comprising a strip of resilient sheet metal of bowed form, projecting hooks at the ends of the strip turned inwardly toward the concave side of the bow, said strip having longitudinally elongated sections through the strip providing integral resilient means to engage and hold the opposite sides of a threaded nut, which may be inserted by pressing the nut laterally thereof to position.

4. A two-part fastener comprising a bowed strip of resilient sheet material having downwardly projecting tongues at its opposite ends to attach the strip to a support and integral projecting portions partially severed from the strip and bent upwardly from intermediate regions of the strip, and a nut resting on the strip between said upwardly projecting portions and held thereby against rotation, the strip engaging the nut in a manner to hold it in assembled position thereon.

5. A nut holder comprising a bowed strip of resilient sheet material with downwardly projecting tongues at its opposite ends and a pair of tongues cut out from the intermediate region of the strip and bent upwardly and then inwardly to overhang the top of a nut resting on the clip, the holder having provision to engage the nut in a manner to retain it in assembled position on the holder.

GEORGE A. TINNERMAN.